US012773735B2

(12) United States Patent
Luik

(10) Patent No.: US 12,773,735 B2
(45) Date of Patent: Oct. 27, 2026

(54) CUTTING INSERT AND TOOL FOR MACHINING

(71) Applicant: Hartmetall-Werkzeugfabrik Paul Horn GmbH, Tuebingen (DE)

(72) Inventor: Matthias Luik, Reutlingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 340 days.

(21) Appl. No.: 18/425,456

(22) Filed: Jan. 29, 2024

(65) Prior Publication Data

US 2024/0165712 A1 May 23, 2024

Related U.S. Application Data

(63) Continuation of application No. PCT/EP2022/070951, filed on Jul. 26, 2022.

(30) Foreign Application Priority Data

Aug. 5, 2021 (DE) ..................... 10 2021 120 357.0

(51) Int. Cl.
*B23B 27/10* (2006.01)
*B23B 27/14* (2006.01)

(52) U.S. Cl.
CPC ............ *B23B 27/10* (2013.01); *B23B 27/143* (2013.01); *B23B 2250/12* (2013.01)

(58) Field of Classification Search
CPC .... B23B 2250/12; B23B 27/10; B23D 77/006
See application file for complete search history.

(56) References Cited

U.S. PATENT DOCUMENTS 3,076,357 A 2/1963 Benjamin et al.
5,163,790 A 11/1992 Vig
(Continued)

FOREIGN PATENT DOCUMENTS

DE 3432615 C2 1/1988
DE 4003257 A1 8/1991
(Continued)

OTHER PUBLICATIONS

Decision to Grant a Patent (Including Translation) for corresponding Japanese Patent Application No. 2024-506730, mailed Jun. 3, 2025.
(Continued)

*Primary Examiner* — Jacob J Cigna
(74) *Attorney, Agent, or Firm* — Jason H Vick; Amped IP LLC

(57) ABSTRACT

A cutting insert for a tool for machining a workpiece. The cutting insert comprises a clamping section which comprises a coolant channel which is configured as a through-hole. Further, the cutting insert comprises a cutting head having at least one cutting member which comprises a main cutting edge, a rake face which adjoins the main cutting edge, and a chip-breaking geometry which protrudes from the rake face or which is introduced into the rake face and which is configured to break a chip which is machined with the main cutting edge. Furthermore, the cutting insert comprises a cantilever arm which connects the clamping section to the cutting head and which has a smaller diameter than the clamping section. A portion of the cutting head comprising the chip-breaking geometry at least partially covers the coolant channel when viewed in a plan view from a front side along a longitudinal axis of the cutting insert.

14 Claims, 3 Drawing Sheets

(56) References Cited

U.S. PATENT DOCUMENTS

| | | | | |
|---|---|---|---|---|
| 5,474,406 | A | 12/1995 | Kress et al. | |
| 5,901,623 | A | 5/1999 | Hong | |
| 8,087,854 | B2 | 1/2012 | Kleiner | |
| 8,393,830 | B2 | 3/2013 | Hideta | |
| 8,568,068 | B2 | 10/2013 | Kleiner et al. | |
| 8,647,024 | B2 | 2/2014 | Saji | |
| 9,539,658 | B2 | 1/2017 | Eigenmann et al. | |
| 9,931,699 | B2 | 4/2018 | Kitagawa | |
| 10,507,529 | B2 | 12/2019 | Kobayashi et al. | |
| 11,370,032 | B2 | 6/2022 | Ando | |
| 2007/0081867 | A1 | 4/2007 | Murakami et al. | |
| 2012/0082518 | A1 | 4/2012 | Woodruff et al. | |
| 2013/0115017 | A1 | 5/2013 | Schanz et al. | |
| 2014/0147219 | A1 | 5/2014 | Kaufmann et al. | |
| 2014/0356082 | A1 | 12/2014 | Smith et al. | |
| 2015/0003921 | A1 | 1/2015 | Andersson et al. | |
| 2018/0154462 | A1 | 6/2018 | Yamamichi | |
| 2021/0291278 | A1 | 9/2021 | Schaefer | |
| 2023/0182212 | A1* | 6/2023 | Zettler .................... | B22F 10/20 407/110 |

FOREIGN PATENT DOCUMENTS

| | | | | |
|---|---|---|---|---|
| DE | 4320511 | A1 | 12/1994 | |
| DE | 202004008566 | U1 | 10/2005 | |
| DE | 102007023167 | A1 | 11/2008 | |
| DE | 102010046312 | A1 | 3/2011 | |
| DE | 202010002058 | U1 | 6/2011 | |
| DE | 102010002669 | A1 | 9/2011 | |
| DE | 102010021520 | A1 | 9/2011 | |
| DE | 102010051377 | A1 | 5/2012 | |
| DE | 102011082979 | A1 | 3/2013 | |
| DE | 102016105354 | A1 * | 9/2017 | ............. B23B 27/00 |
| EP | 0504100 | A1 | 9/1992 | |
| EP | 2146816 | B1 | 2/2012 | |
| EP | 2148757 | B1 | 6/2013 | |
| EP | 2821167 | A1 | 1/2015 | |
| EP | 2550126 | B1 | 10/2016 | |
| GB | 2228695 | A | 9/1990 | |
| JP | S52-69082 | U | 5/1977 | |
| JP | H04-51306 | U | 4/1992 | |
| JP | H05-92316 | A | 4/1993 | |
| JP | H06-39305 | U | 5/1994 | |
| JP | H06-134648 | A | 5/1994 | |
| JP | H06-57503 | U | 8/1994 | |
| JP | 2003-071608 | A | 3/2003 | |
| JP | 2005-066795 | A | 3/2005 | |
| JP | 2007-075933 | A | 3/2007 | |
| JP | 2007-268695 | A | 10/2007 | |
| JP | 2009-061578 | A | 3/2009 | |
| JP | 2010-105084 | A | 5/2010 | |
| JP | 2010-527798 | A | 8/2010 | |
| JP | 2011-088270 | A | 5/2011 | |
| JP | 2014-034066 | A | 2/2014 | |
| JP | 2016-055360 | A | 4/2016 | |
| JP | 2022-513767 | A | 2/2022 | |
| RU | 2327550 | C2 | 6/2008 | |
| RU | 2529137 | C2 | 9/2014 | |
| WO | WO 2015/056496 | A1 | 4/2015 | |
| WO | WO 2016/186217 | A1 | 11/2016 | |
| WO | WO 2017/018369 | A1 | 2/2017 | |
| WO | WO 2019/069924 | A1 | 4/2019 | |
| WO | WO 2020/178152 | A1 | 9/2020 | |

OTHER PUBLICATIONS

International Search Report for International Application No. PCT/EP2022/070951, mailed Nov. 28, 2022.

Written Opinion for International Application No. PCT/EP2022/070951, mailed Nov. 28, 2022.

Notice to Submit Response (Including Translation) for corresponding Korean Patent Application No. 10-2024-7006516, mailed Sep. 16, 2025.

International Preliminary Report on Patentability for International Application No. PCT/EP2022/070951, mailed Feb. 15, 2024.

Decision to Grant a Patent for an Invention (Including Translation) for corresponding Russian Patent Application No. 2024101558/05(003154), mailed Sep. 20, 2024.

Notification of Reasons for Rejection (Including Translation) for corresponding Japanese Patent Application No. 2024-506730, mailed Jan. 7, 2025.

* cited by examiner

CUTTING INSERT AND TOOL FOR MACHINING

CROSS REFERENCE TO RELATED APPLICATIONS

This application is a continuation of international patent application PCT/EP2022/070951, filed on Jul. 26, 2022 designating the U.S., which international patent application has been published in German language and claims priority from German patent application DE 10 2021 120 357.0, filed on Aug. 5, 2021. The entire contents of these priority applications are incorporated herein by reference.

BACKGROUND

This disclosure relates to a cutting insert for a tool for machining a workpiece. The disclosure further relates to a tool having such a cutting insert.

The herein presented tool may, for example, be a reaming tool. However, the present disclosure is not limited to such a reaming tool. The tool according to this disclosure in which the cutting insert according to this disclosure is inserted may also be a different type of cutting tool, for example, a turning tool, a drilling tool, a milling tool, etc. The tool according to the disclosure is preferably used in a machine tool, such as, for example, a CNC processing center.

The herein presented tool has in addition to the cutting insert a cutting insert holder for holding the cutting insert. Preferably, the cutting insert is releasably secured in the cutting insert holder in order to be able to replace it in the event of wear.

A central objective with such tools is the production of the best possible chip break in order to avoid undesirably long chips during processing. Good chip-breaking properties not only lead to a longer service-life of the cutting inserts used in the tools, but also have a positive effect on the surface nature of the processed workpieces.

In order to increase the service-life and improve the process reliability, it is further necessary to supply the processing location with sufficient coolant/lubricant (referred to below for the sake of simplicity as “coolant”). Accordingly, coolant channels are often integrated in the tool and/or the cutting insert. They are intended to ensure that the regions of the tool which are most heavily loaded receive a sufficient supply of coolant at any time during use.

Examples of machining tools with integrated coolant channels are disclosed in the following documents: DE 10 2007 023 167 A1, DE 10 2010 002 669 A1, DE 10 2010 021 520 A1, DE 10 2010 051 377 A1, DE 20 2004 008 566 U1, EP 2 146 816 B1, EP 2 148 757 1 and EP2 550 126 B1.

SUMMARY

It is an object to provide a cutting insert for a tool for machining and such a tool in which the chip-breaking properties and the coolant supply are further improved.

According a first aspect, a cutting insert is presented, comprising:

- a clamping section which comprises a coolant channel configured as a through-hole;
- a cutting head having at least one cutting member which comprises a main cutting edge, a rake face which adjoins the main cutting edge, and a chip-breaking geometry which protrudes from the rake face or which is introduced into the rake face and which is configured to break a chip which is machined with the main cutting edge; and
- a cantilever arm which extends along a longitudinal axis of the cutting insert and connects the clamping section to the cutting head and which has a smaller diameter than the clamping section;
- wherein the cutting insert is configured in a monolithic manner so that the clamping section, the cutting head and the cantilever arm are integrally connected to each other; and
- wherein a portion of the cutting head comprising the chip-breaking geometry, when viewed along the longitudinal axis of the cutting insert, covers at least 10% of a cross section of the coolant channel, but a maximum of 80% of the cross section of the coolant channel.

According a second aspect, a tool for machining a workpiece, having a cutting insert and a cutting insert holder for holding the cutting insert, is presented, wherein the cutting insert comprises:

- a clamping section which comprises a coolant channel configured as a through-hole;
- a cutting head having at least one cutting member which comprises a main cutting edge, a rake face which adjoins the main cutting edge, and a chip-breaking geometry which protrudes from the rake face or which is introduced into the rake face and which is configured to break a chip which is machined with the main cutting edge; and
- a cantilever arm which extends along a longitudinal axis of the cutting insert and connects the clamping section to the cutting head and which has a smaller diameter than the clamping section;
- wherein the cutting insert is configured in a monolithic manner so that the clamping section, the cutting head and the cantilever arm are integrally connected to each other; and
- wherein a portion of the cutting head comprising the chip-breaking geometry, when viewed along the longitudinal axis of the cutting insert, covers at least 10% of a cross section of the coolant channel, but a maximum of 80% of the cross section of the coolant channel.

As a result of the geometry which is provided on the at least one cutting member, the chip-breaking properties of the cutting insert are significantly improved. In addition, the geometric coverage of the coolant channel with the portion of the cutting head on which the chip-breaking geometry is arranged ensures an optimum coolant supply. In contrast to what is often the case with cutting inserts from the prior art, it is thereby ensured that the coolant reaches the location, which is decisive for the chip-breaking properties, of the cutting insert. This is because the majority of the coolant which is discharged from the coolant channel consequently strikes the chip-breaking geometry directly and does not spray, as is otherwise often the case, beyond the cutting member of the cutting insert or laterally past it.

With the mentioned geometric coverage of the coolant channel with the chip-breaking geometry as occurs in the plan view from the front, it is accepted that the jet of coolant discharged from the coolant channel collides with portions of the cutting head and is thereby partially redirected by the cutting head. However, it has been found that, in comparison with cutting inserts and tools in which the coolant jet sprays at the front completely freely (that is to say, not in a redirected manner) over the blade, this leads to significantly improved chip formation properties. All in all, as a result of the configuration of the cutting insert, an improved chip breakage and a higher level of process reliability can be achieved.

The cutting insert is configured in a monolithic manner, that is to say, in one piece, so that the clamping section, the cutting head and the cantilever arm are integrally connected to each other.

This increases the mechanical stability of the cutting insert, which is particularly advantageous when the cutting insert is sized to be comparatively small.

The portion of the cutting head comprising the chip-breaking geometry, when viewed in a plan view from the front along the longitudinal axis of the cutting insert, covers at least 10% of a cross section of the coolant channel, but a maximum of 80% of the cross section of the coolant channel.

This coverage enables, as already mentioned, the at least one cutting member, in particular the chip-breaking geometry and rake face which are arranged therein, to be supplied with coolant/lubricant in an optimum manner.

If the cutting head were to cover more than 80% of the cross section of the coolant channel, adequate cooling and lubrication of the at least one cutting member would no longer be ensured since a large portion of the coolant already then collides beforehand with the cutting head at another location.

According to another refinement, it is preferable for the cantilever arm not to cover the coolant channel when viewed in a plan view from the front along the longitudinal axis of the cutting insert.

This has the advantage that the coolant jet discharged from the coolant channel is discharged from the clamping section and reaches the cutting head freely without colliding with the cantilever arm or being redirected by it. Accordingly, the coolant jet retains a large portion of its kinetic energy as far as the impact location against the chip-breaking geometry which is arranged on the cutting head.

According to another refinement, it is provided that the chip-breaking geometry is spaced apart from the main cutting edge and that a first portion of the rake face extends along the main cutting edge between the chip-breaking geometry and the main cutting edge.

A positive cutting angle can thereby be achieved, by means of which the chip-breaking properties can be additionally improved. This is particularly advantageous with reaming tools or other cutting tools in which very thin chips typically occur. Without the mentioned positive cutting angle in combination with the chip-breaking geometry, such a thin chip would otherwise not break in a sufficiently reliable manner. This can lead to scratching of the surface of the cutting member and consequently also to scratching of the rake face, whereby ultimately the wear would be increased and the service-life of the cutting insert would be shortened.

According to another refinement, the cutting member further comprises an auxiliary cutting edge which is orientated transversely relative to the main cutting edge, wherein a second portion of the rake face extends along the auxiliary cutting edge between the chip-breaking geometry and the auxiliary cutting edge.

The term “transversely” describes in this instance an orientation of the two cutting edges at an angle which is not equal to 0°. The two cutting edges (main and auxiliary cutting edge) are preferably orientated at an acute angle or a right angle with respect to each other. In principle, however, an orientation at an obtuse angle with respect to each other is also possible.

The chip-breaking geometry is according to the previously mentioned refinement completely enclosed by the rake face both in the direction of the main cutting edge and in the direction of the auxiliary cutting edge, which leads to the above-mentioned advantages (positive cutting angle, improved chip breakage and consequently extended service-life).

Preferably, both the main cutting edge and the auxiliary cutting edge are in each case configured in a rectilinear manner (not curved).

According to another refinement, it is provided that the cantilever arm to extend substantially along the longitudinal axis of the cutting insert and for the cutting member to protrude transversely relative thereto, laterally from the cutting head.

Preferably, the diameter of the cantilever arm or the transverse extent thereof (extent transversely relative to the longitudinal axis of the cutting insert) is configured to be thinner than the corresponding diameter or the corresponding transverse extent of the cutting head and the clamping section.

According to another refinement, the coolant channel is orientated parallel to the longitudinal axis of the cutting insert.

The jet of coolant which is discharged from the coolant channel which is arranged in the clamping section consequently extends parallel along the cantilever arm and strikes the cutting member parallel with the longitudinal axis of the cutting insert in the region of the chip-breaking geometry.

With this type of orientation of the coolant jet and the individual components of the cutting insert relative to each other, it is further preferable for the clamping section to have on the outer side thereof at least one clamping face which is orientated parallel with the longitudinal axis of the cutting insert.

According to another refinement, it is preferable for the chip-breaking geometry to be in the form of a raised geometry which protrudes from the rake face.

The chip-breaking geometry protrudes in this instance upward from the rake face. The chip-breaking properties are thereby additionally improved.

In another refinement, it is provided that a center axis of the coolant channel is orientated parallel to a surface portion of the chip-breaking geometry or is located in a plane with this surface portion.

This results in the coolant jet striking the mentioned surface portion of the chip-breaking geometry in a parallel or even tangential manner. This leads to optimum cooling and lubrication of the at least one cutting member. The chip removal is also improved by this type of orientation of the coolant jet.

According to another refinement, a cross section of the coolant channel is non-round. Of course, the cross section of the coolant channel may also be configured to be round (circular).

As a result of a non-round configuration, for example, as a result of an elliptical or oval configuration of the coolant channel cross section, the coolant jet can be even better orientated with respect to the at least one cutting member.

According to another refinement, a cross section of the coolant channel at a first end, facing away from the cutting head, of the coolant channel is larger than at a second end, facing the cutting head, of the coolant channel. The coolant channel may according to this embodiment be configured, for example, in a conically tapering manner. Alternatively, the coolant channel may in the interior thereof be in the form of a recessed hole with portions of different diameters.

A decrease of the coolant channel diameter from the first end thereof to the second end thereof brings about a type of nozzle effect, by means of which the discharge speed of the coolant channel can be increased. This is again advantageous with respect to improved chip removal.

Of course, the features which have been mentioned above and which will be explained below can be used not only in the combination set out in each case, but also in other combinations or alone without departing from the spirit and scope of the present disclosure.

DESCRIPTION OF PREFERRED EMBODIMENTS

FIG. 1 and FIGS. 3 to 6 show an exemplary embodiment of the cutting insert in various views. The cutting insert is designated 10 in its entirety. FIG. 2 shows an exemplary embodiment of the tool which comprises the cutting insert and an associated cutting insert holder. The tool is designated 100 in its entirety.

Figure 1:
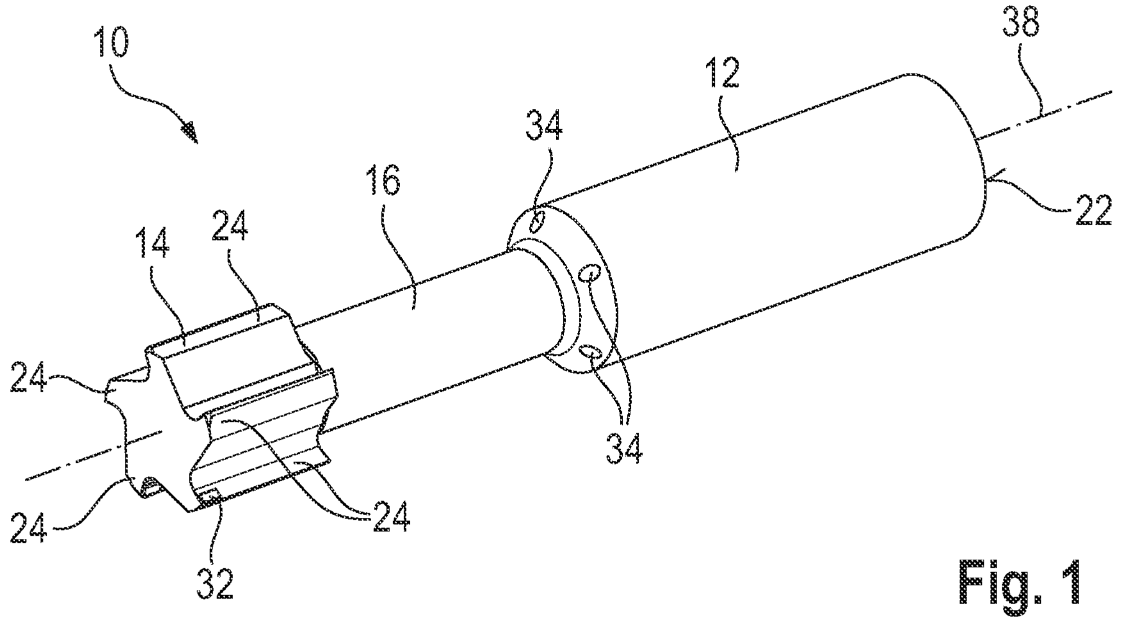
FIG. 1 shows a perspective view of an exemplary embodiment of the cutting insert.
Figure 2:
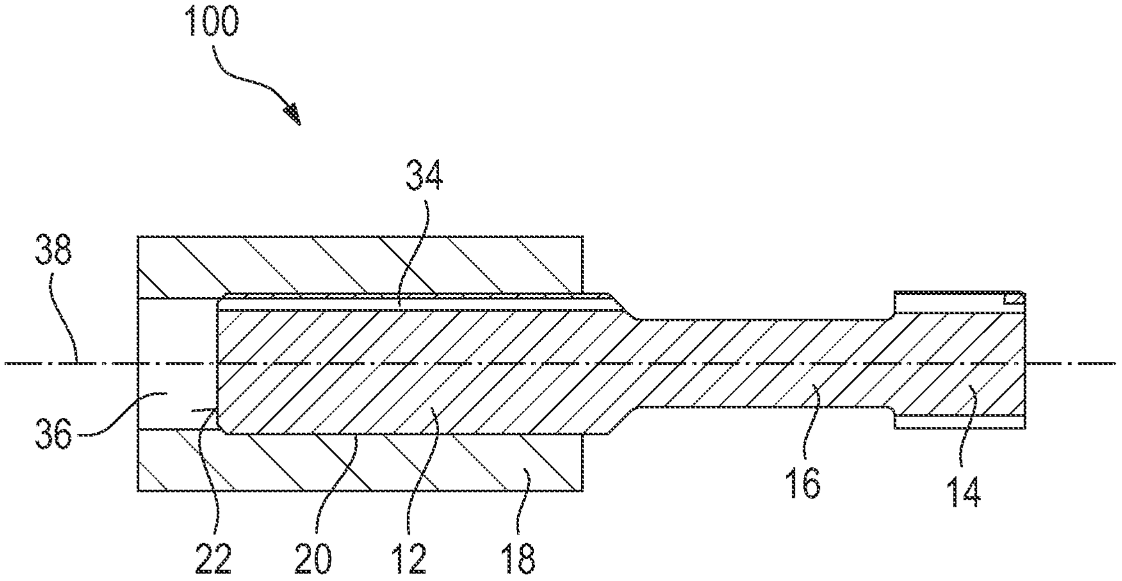
FIG. 2 shows a side view of an exemplary embodiment of the tool with the cutting insert and a cutting insert holder which is illustrated schematically and in section.
Figure 3:
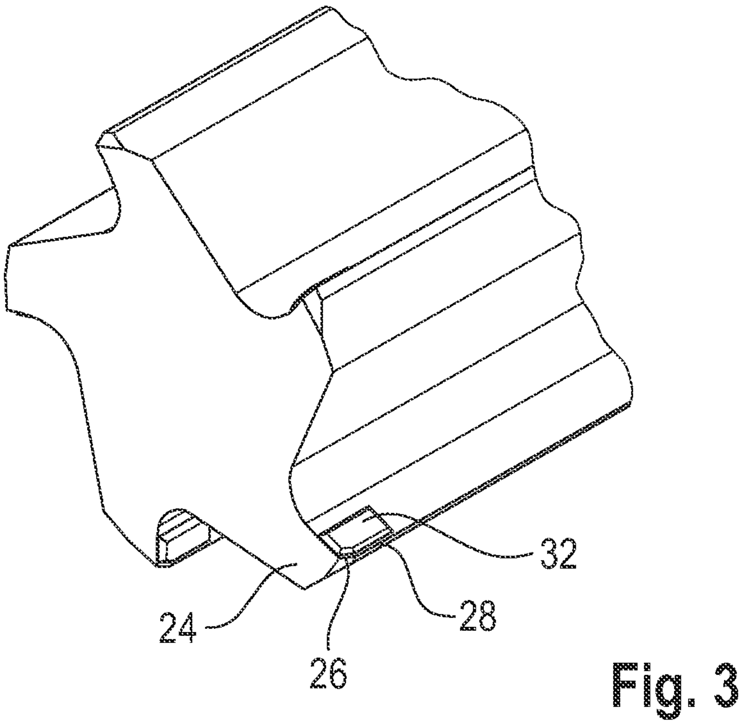
FIG. 3 shows a partial view of a cutting head of the cutting insert from FIG. 1.
Figure 4:
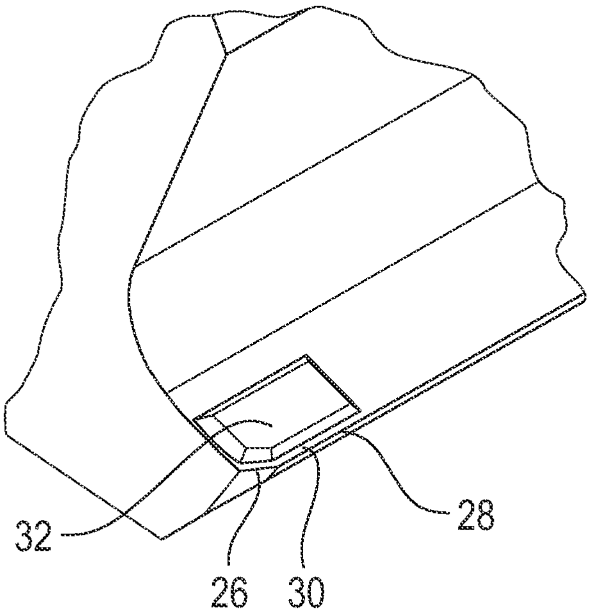
FIG. 4 shows a detailed view of a cutting member of the cutting head illustrated in FIG. 3.

The cutting insert 10 shown in FIG. 1 is a cutting insert for a reaming tool. The cutting insert 10 has a clamping section 12, a cutting head 14 and a cantilever arm 16. The cutting insert 10 is configured in a monolithic manner. It thus comprises one piece, wherein the clamping section 12, the cutting head 14 and the cantilever arm 16 are connected to each other in an integral manner. The cutting head 10 is preferably produced completely from hard metal.

The clamping section 12 serves to clamp the cutting insert 10 in a cutting insert holder 18 (see FIG. 2). In the exemplary embodiment shown in this instance, the clamping section is configured in a cylindrical manner. Accordingly, the cutting insert receiving member 20 provided in the cutting insert holder 18 also has a cylindrical cross section. However, it is self-evident that the clamping section 12 and the cutting insert receiving member 20 may have any other cross sectional shapes (for example, shaped in a rectangular, square, oval or complex manner).

The cutting insert receiving member 20 which is provided in the cutting insert holder 18 is preferably in the form of a pot-like receiving member in which the cutting insert 10 can be introduced from the front side. Screws or other securing means may be provided in order to fix the cutting insert 10 in the cutting insert receiving member 20. In the assembled state, the clamping section 12 of the cutting insert 10 preferably abuts along the circumference thereof and with the end rear side 22 thereof against corresponding counter-abutment faces in the cutting insert receiving member 20. Instead of a complete abutment, a partial abutment against the circumference of the clamping section 12 may also be provided.

The cutting insert holder 18 is illustrated schematically in FIG. 2. The cutting insert holder 18 may be a conventional tool holder. Similarly, the cutting insert holder 18 may also be a part of a machine tool in which the cutting insert 10 is used. For example, in the latter case, the cutting insert holder 18 is a clamping chuck which is integrated directly in the machine tool.

The cutting head 14 has in the exemplary embodiment shown in this instance five cutting members 24 which protrude laterally from the cutting head 14. Each of these cutting members 24 has a main cutting edge 26 and an auxiliary cutting edge 28 which adjoins the main cutting edge 26 and which extends transversely relative thereto (see FIGS. 3-4). The main cutting edge 26 and the auxiliary cutting edge 28 are in the exemplary embodiment shown in this instance in the form of linear cutting edges. The main and auxiliary edges 26, 28 are adjoined inwardly by a clamping face 30 which can be seen in particular in the detail illustrated in FIG. 4.

A chip-breaking geometry 32 which in practice is also often referred to as a chip guiding step is arranged on the rake face 30.

The chip-breaking geometry 32 is configured to break a chip (not illustrated) which is machined with the main cutting edge 26. This is carried out substantially by means of chip deformation. The chip which is machined at the main cutting edge 26 is redirected by means of the chip-breaking geometry 32, whereby it is even more powerfully curved and is thereby forced to break.

The chip-breaking geometry 32 is in the embodiment shown in this instance in the form of a raised geometry which protrudes upward from the rake face 30. In principle, however, it is also possible to configure the chip-breaking geometry as a recessed structure which is introduced into the rake face 30.

Depending on the type of use and configuration of the cutting insert 10, the cutting head 14 may also comprise more or less than five of these cutting members 24. For example, the cutting head 14 of the cutting insert 10 may also comprise only one cutting member 24. This is mostly the case particularly when the cutting insert 10 is used in a turning tool. Of course, the cutting head 14 when used as a turning tool cutting insert is shaped very differently from the one in the exemplary embodiment shown in this instance.

There are arranged in the clamping section 12—in accordance with the number of cutting members 24—in the present exemplary embodiment five coolant channels 34 which serve to supply coolant to the cutting head 14. From these coolant channels 34 one coolant jet is discharged in each case and is orientated in each case with respect to one of the cutting members 24. These coolant jets preferably strike the cutting head 14 as free jets without being diverted or redirected by the cantilever arm 16. The cantilever arm 16 which connects the clamping section 12 to the cutting head 14 therefore preferably has a smaller diameter than the clamping section 12 and the cutting head 14. The cantilever arm 16 extends substantially along the longitudinal axis 38 of the cutting insert 10.

The coolant supply to the individual coolant channels 34 is carried out via the cutting insert holder 18. To this end, for example, a coolant channel 36 which feeds all the coolant channels 34 provided in the cutting insert 10 together is provided in the cutting insert holder 18. Alternatively, however, a plurality of coolant channels 36 which supply the coolant channels 34 provided in the cutting insert 10 individually may also be provided in the cutting insert holder 18. At this point, it should also be noted again that, in the event of a configuration of the cutting head with only a single cutting member 24, preferably only one coolant channel is also provided inside the clamping section 12.

Each of the coolant channels 34 extends preferably parallel with the longitudinal axis 38 of the cutting insert 10. Each of the coolant channels 34 is in the form of a through-hole which extends through the clamping section 12. The respective through-hole has a contour which is completely closed at the circumference. The coolant channels 34 are thus in each case closed at the circumference so that laterally no coolant can be discharged from the clamping section 12 of the cutting insert 10.

The arrangement of the coolant channels 34 relative to the cutting members 24 will be discussed in greater detail below. This is carried out using the example of a coolant channel 34 or a cutting head 24.

Figure 5:
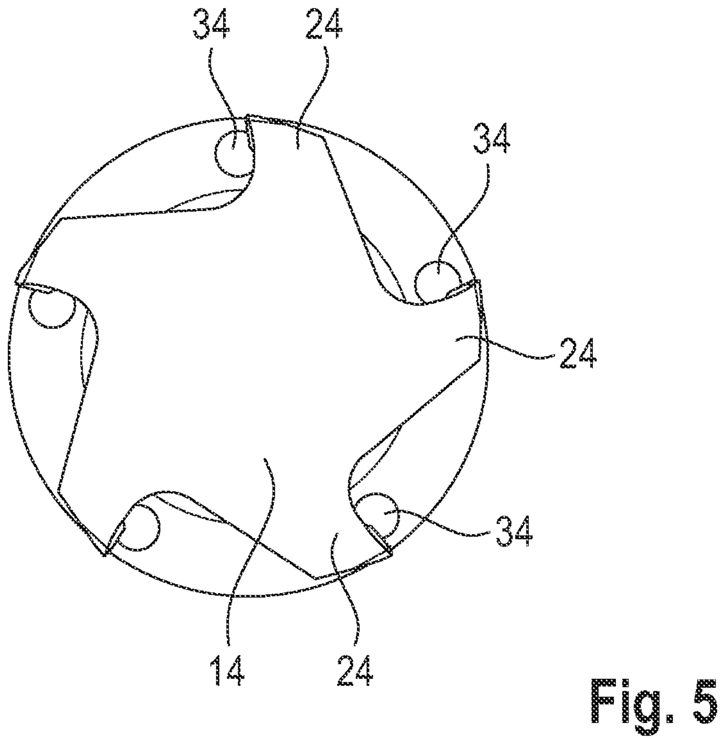
FIG. 5 shows a plan view from the front of the cutting insert illustrated in FIG. 1.
Figure 6:
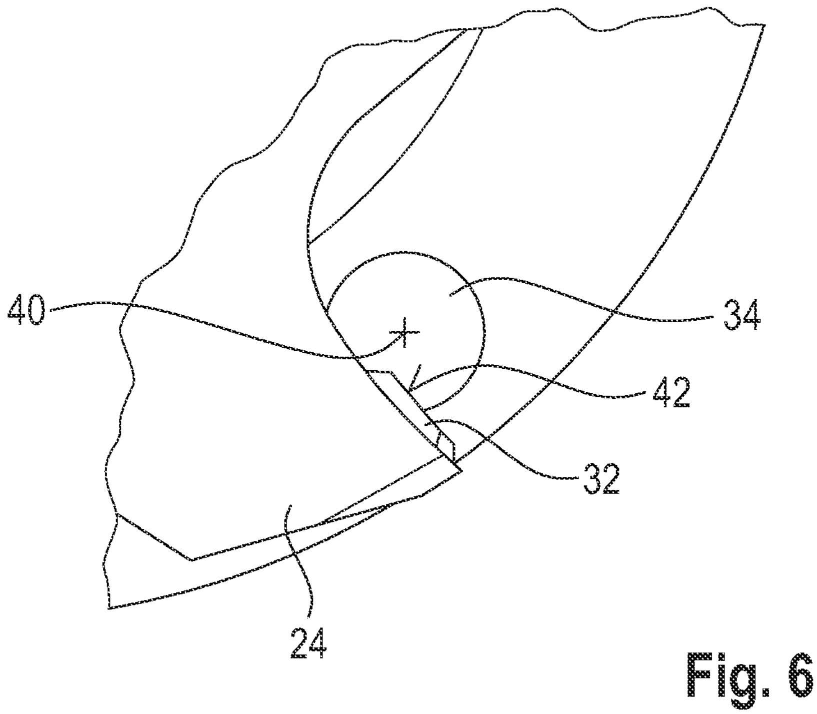
FIG. 6 shows a detail from FIG. 5.

The coolant channel 34 is arranged in such a manner that, in the plan view from the front of the cutting insert, as illustrated in FIGS. 5 and 6, it is at least partially concealed by the cutting member 24 which is associated therewith. The coolant channel 34 is in this instance in particular concealed by the portion of the cutting member 24 on which the chip-breaking geometry 32 is arranged. Preferably, the portion of the cutting member 24 comprising the chip-breaking geometry 32, when viewed as a plan view from the front along the longitudinal axis 38 of the cutting insert 10, covers at least 10% of the cross section of the coolant channel 24, but a maximum of 80% of the cross section of the coolant channel 34. An optimum cooling and lubrication of the components of the cutting head 14 used in the machining processing operation is thereby ensured.

The cutting member 24 and the chip-breaking geometry 32 which is arranged thereon are preferably arranged to be offset radially outward relative to the coolant channel 34. It is particularly preferable for a center axis 40 of the coolant channel 34 to be orientated parallel with a surface portion 42 of the chip-breaking geometry. The mentioned surface portion 42 which is located at the upper side of the chip-breaking geometry 32 may also be arranged in a plane with the center axis 40 of the coolant channel 34.

Although a portion of the coolant jet which is discharged from the coolant channel 34 as a result of the mentioned coverage of the coolant channel 34 strikes the rear side of the cutting head 14, it has nonetheless been found that such an arrangement of the coolant channel 34 relative to the cutting head 14 ensures an optimum cooling and lubrication and also an optimum chip removal since the coolant can thus flow around the cutting head 14 or the cutting member 24 thereof in an optimum manner.

Various other optimizations of the cutting insert 10 are possible. The coolant channel 34 does not necessarily have to be configured with a circular cross section. Oval or elliptical cross sections are, for example, also conceivable in order to construct the coolant jet in a "flat" manner as far as possible. There may further be provision for the cross section of the coolant channel 34 to taper from the first end thereof facing away from the cutting head 14 toward the second end thereof facing the cutting head 14. A type of nozzle effect is thereby achieved, by means of which the coolant is accelerated within the coolant channel 34. Alternatively, the coolant channel 34 may also be recessed or stepped in the interior thereof so that, for example, a first portion which adjoins the first end has a larger diameter and a second portion which adjoins the second end has a smaller diameter. Various other adaptations, in particular to the shape of the cutting head 14, are, as already mentioned, also possible depending on the application of the cutting insert 10.

What is claimed is:

1. A cutting insert for a tool configured to machine a workpiece, the cutting insert comprising:

a clamping section including a coolant channel configured as a through-hole;

a cutting head having at least one cutting member which includes a main cutting edge, a rake face which adjoins the main cutting edge, and a chip-breaking geometry which protrudes from the rake face or which is introduced into the rake face and which is configured to break a chip which is machined with the main cutting edge; and a cantilever arm which extends along a longitudinal axis of the cutting insert and connects the clamping section to the cutting head and which has a smaller diameter than the clamping section;

wherein the cutting insert is a monolithic structure where the clamping section, the cutting head and the cantilever arm are integrally connected to each other; and wherein a portion of the cutting head comprising the chip-breaking geometry, when viewed along the longitudinal axis of the cutting insert, covers between at least 10% of a cross section of the coolant channel and a maximum of 80% of the cross section of the coolant channel.

2. The cutting insert as claimed in claim 1, wherein the cantilever arm does not cover the coolant channel when viewed along the longitudinal axis of the cutting insert.

3. The cutting insert as claimed in claim 1, wherein the main cutting edge is rectilinear.

4. The cutting insert as claimed in claim 1, wherein the cantilever arm extends along the longitudinal axis of the cutting insert, and wherein the cutting member protrudes from the cutting head in a direction transverse to the longitudinal axis of the cutting insert.

5. The cutting insert as claimed in claim 1, wherein the coolant channel extends parallel to the longitudinal axis of the cutting insert.

6. The cutting insert as claimed in claim 1, wherein the chip-breaking geometry is configured as a raised geometry which protrudes from the rake face.

7. The cutting insert as claimed in claim 1, wherein a center axis of the coolant channel extends parallel to or is coplanar with a surface portion of the chip-breaking geometry.

8. The cutting insert as claimed in claim 1, wherein a cross section of the coolant channel is non-round.

9. The cutting insert as claimed in claim 1, wherein a first cross section of the coolant channel at a first end of the coolant channel that faces away from the cutting head is larger than a second cross section of the coolant channel at a second end of the coolant channel that faces the cutting head.

10. The cutting insert as claimed in claim 1, wherein the chip-breaking geometry is spaced apart from the main cutting edge.

11. The cutting insert as claimed in claim 10, wherein a first portion of the rake face extends along the main cutting edge between the chip-breaking geometry and the main cutting edge.

12. The cutting insert as claimed in claim 11, wherein the cutting member further comprises an auxiliary cutting edge which is orientated transversely relative to the main cutting edge, and wherein a second portion of the rake face extends along the auxiliary cutting edge between the chip-breaking geometry and the auxiliary cutting edge.

13. The cutting insert as claimed in claim 12, wherein the auxiliary cutting edge is rectilinear.

14. A tool configured to machine a workpiece comprising:

a cutting insert and a cutting insert holder configured to hold the cutting insert, wherein the cutting insert comprises:

a clamping section which comprises at least one coolant channel configured as a through-hole;

a cutting head having at least one cutting member which comprises a main cutting edge, a rake face which adjoins the main cutting edge, and a chip-breaking geometry which protrudes from the rake face or which is introduced into the rake face and which is configured to break a chip which is machined with the main cutting edge; and a cantilever arm which extends along a longitudinal axis of the cutting insert and connects the clamping section to the cutting head and which has a smaller diameter than the clamping section;

wherein the cutting insert is a monolithic structure where the clamping section, the cutting head and the cantilever arm are integrally connected to each other; and wherein a portion of the cutting head comprising the chip-breaking geometry, when viewed along the longitudinal axis of the cutting insert, covers between at least 10% of a cross section of the coolant channel and a maximum of 80% of the cross section of the coolant channel.

* * * * *